United States Patent [19]
Robinson

[11] Patent Number: 5,544,242
[45] Date of Patent: Aug. 6, 1996

[54] SPEAKERPHONE WITH EVENT DRIVEN CONTROL CIRCUIT

[75] Inventor: Neil E. Robinson, Sunnyvale, Calif.

[73] Assignee: Exar Corporation, San Jose, Calif.

[21] Appl. No.: 351,573

[22] Filed: Dec. 6, 1994

Related U.S. Application Data

[63] Continuation of Ser. No. 67,460, May 25, 1993, abandoned.

[51] Int. Cl.$^6$ ........................................................ H04M 9/08
[52] U.S. Cl. ............................ 379/390; 379/389; 379/388; 379/406
[58] Field of Search .................................... 379/390, 215, 379/388, 389, 406, 411, 387, 395, 407; 370/32.1, 32

[56] References Cited

U.S. PATENT DOCUMENTS

| | | | |
|---|---|---|---|
| 1,814,017 | 7/1931 | Wright et al. | |
| 1,814,018 | 7/1931 | Wright et al. | |
| 2,269,565 | 1/1942 | Tillman | 379/389 |
| 2,964,598 | 12/1960 | Parker | 379/390 |
| 3,560,669 | 2/1971 | Foulkes et al. | 379/409 |
| 3,610,835 | 10/1971 | Reid | 379/389 |
| 3,660,603 | 5/1972 | Andersen | 379/389 |
| 3,725,585 | 4/1973 | Moniak et al. | 379/389 |
| 3,751,602 | 8/1973 | Breeden | 379/390 |
| 3,889,059 | 6/1975 | Thompson et al. | 379/390 |
| 3,894,187 | 7/1975 | Shibata et al. | 379/390 |

(List continued on next page.)

FOREIGN PATENT DOCUMENTS

| | | | |
|---|---|---|---|
| 0082755A1 | 6/1983 | European Pat. Off. | H04M 9/10 |
| 0376588 | 7/1990 | European Pat. Off. | |
| 0376866A1 | 7/1990 | European Pat. Off. | H04M 9/08 |
| 0482745 | 4/1992 | European Pat. Off. | |
| 9306679 | 4/1993 | European Pat. Off. | |
| 2603397 | 3/1988 | France | G05F 3/26 |
| 56-46313A | 4/1981 | Japan | H03G 3/02 |
| 63-73759 | 8/1987 | Japan | H04M 9/10 |
| 63-63249 | 8/1987 | Japan | H04M 1/60 |
| 1387074 | 3/1975 | United Kingdom | H04B 3/24 |
| 1485321 | 9/1977 | United Kingdom | H04B 3/24 |
| 1550721 | 8/1979 | United Kingdom | H04B 3/24 |
| 1568329 | 5/1980 | United Kingdom | H04B 3/20 |
| 2091962 | 8/1982 | United Kingdom . | |
| 2194868 | 3/1988 | United Kingdom | H04M 9/08 |
| 2194694 | 3/1988 | United Kingdom | H03G 3/20 |
| WO84/03407 | 8/1984 | WIPO | H04M 1/60 |
| WO87/01255 | 2/1987 | WIPO | H04M 9/08 |

OTHER PUBLICATIONS

"A DC to 1–GHz Differential Monolithic Variable–Gain Amplifier", Robert G. Meyer et al., *IEEE Journal of Solid–State Circuits* vol. 26 (1991) Nov., No. 11, New York.

"A Low–Cost Voice–Switched Speakerphone IC", W. David Pace et al.

"General Aspects of Hands–Free Telephony", J. W. Emling, Paper 57–137, AIEE Winter General Meeting, New York, NY, Jan. 21–25, 1957.

(List continued on next page.)

*Primary Examiner*—Jeffrey Hofsass
*Assistant Examiner*—Jacques M. Saint-Surin
*Attorney, Agent, or Firm*—Townsend and Townsend and Crew

[57] ABSTRACT

A control circuit for a speakerphone circuit which utilizes an event driven circuit to determine the appropriate gain for the receive and transmit channels is provided. Detectors monitor the relative magnitudes of the signal in the transmit and receive channels. Separate signal-to-noise detectors determine whether signals present in the two channels are voice signals. The event driven circuit receives these inputs, and dependent on the present state (i.e., transmit, receive, or idle) transitions to a new state in accordance with predefined criteria incorporated into the event driven circuit. In particular, the present invention allows a transition in a single step from a receive to a transmit state, without passing through an idle state. Transition or dummy states allow implementation with simple logic and provide hysteresis.

20 Claims, 6 Drawing Sheets

U.S. PATENT DOCUMENTS

| | | | |
|---|---|---|---|
| 3,902,023 | 8/1975 | Lindgren | 379/390 |
| 3,953,676 | 4/1976 | Brown | 379/390 |
| 4,002,854 | 1/1977 | Penrose | 379/389 |
| 4,161,624 | 7/1979 | Brosow | 379/389 |
| 4,241,236 | 12/1980 | Nash | 379/389 |
| 4,264,873 | 4/1981 | Kominami et al. | 330/257 |
| 4,319,086 | 3/1982 | Thompson | 379/390 |
| 4,378,603 | 3/1983 | Eastmond | 455/79 |
| 4,385,207 | 5/1983 | Munson | 379/390 |
| 4,388,730 | 6/1983 | Nash et al. | 455/208 |
| 4,400,584 | 8/1983 | Vilmur | 379/390 |
| 4,490,582 | 12/1984 | Munson | 379/389 |
| 4,507,524 | 3/1985 | Yun | 379/389 |
| 4,513,177 | 4/1985 | Nishino et al. | 379/389 |
| 4,527,014 | 7/1985 | Styrna | 379/390 |
| 4,542,263 | 9/1985 | Mitani | 379/390 |
| 4,555,596 | 11/1985 | Blomley | 379/389 |
| 4,608,462 | 8/1986 | Blomley et al. | 379/389 |
| 4,648,110 | 3/1987 | Elsässer | 379/390 |
| 4,696,032 | 9/1987 | Levy | 379/390 |
| 4,700,382 | 10/1987 | Means et al. | 379/390 |
| 4,715,062 | 12/1987 | Korsky et al. | 379/390 |
| 4,715,063 | 12/1987 | Haddad et al. | 379/390 |
| 4,720,856 | 1/1988 | Pace et al. | 379/390 |
| 4,724,540 | 2/1988 | Pace et al. | 379/390 |
| 4,727,335 | 2/1988 | Yokoyama | 330/254 |
| 4,764,954 | 8/1988 | Tsurusaki et al. | 379/390 |
| 4,879,745 | 11/1989 | Arbel | 379/389 |
| 4,944,002 | 7/1990 | Bader | 379/389 X |
| 4,979,163 | 12/1990 | Erving et al. | 379/390 X |
| 4,982,425 | 1/1991 | Yoshida | 379/390 |
| 5,099,472 | 3/1992 | Townsend et al. | 379/390 X |
| 5,157,350 | 10/1992 | Rubens | 330/254 |
| 5,172,408 | 12/1992 | Petty et al. | 379/390 X |
| 5,319,704 | 6/1994 | Robinson | 379/389 |
| 5,387,877 | 2/1995 | Robinson | 330/254 |

OTHER PUBLICATIONS

"The Bell System Speakerphone", W. F. Clemency et al., Paper 57–139, AIEE Womter General Meeting, New York, NY, Jan. 21–25, 1957.

"A Study of Talking Distance and Related Parameters in Hands–Free Telephony", Gardner, *The Bell System Technical Journal*, Nov. 1960.

"Functional Design of a Voice–Switched Speakerphone", W. F. Clemency et al., *The Bell System Technical Journal*, Monograph 3884, 1961.

"Fundamental Considerations in the Design of a Voice–Switched Speakerphone", A. Busala, *The Bell System Technical Journal*, Monograph 3512, 1960.

"Hands Free Telephone Conversations Are Simplified Using New Integrated Circuits", Gary Kloesz et al., *IEEE Transactions on Consumer Electronics*, vol. CE–31, No. 3, Aug. 1985.

"The Art of Electronics", Paul Horowitz et al., *Cambridge University Press*, 1980, 1989, 1990.

"Basic Electrical Engineering", A. E. Fitzgerald et al., International Student Edition, pp. 444–449, *McGraw–Hill, Inc.*, 1975.

"Speakerphone Design using XR–T6420–1 and XR–T6421", An–30, *Exar Corporation*, Sunnyvale, CA.

"Speakerphone Audio Circuit", XR–T6420–1, *Advance Information*, Exar Corporation, Sunnyvale, CA.

"Specifications and Applications Information", MC34018, *Motorola Telecommunications Device Data*.

"Speakerphone Control IC", XR–T6421, *Advance Information*, Exar Corporation, Sunnyvale, CA.

| TRANSITION | CONDITION | COMPARATOR OUTPUT CONDITION | |
|---|---|---|---|
| IDLE → RX | RX > 2 TX | 30 | A |
| IDLE → TX | TX > 1.1 RX | 36 | $\bar{B}$ |
| RX → TX | TX > 10 RX | 30 | $\bar{A}$ |
| TX → RX | RX > 18.8 TX | 36 | B |

SPEAKERPHONE WITH EVENT DRIVEN CONTROL CIRCUIT

This is a continuation of application Ser. No. 08/067,460, filed May 5, 1993, now abandoned.

BACKGROUND

The present invention relates to control circuits for speakerphone circuits.

A typical speakerphone circuit has a transmit channel coupled between a microphone and the telephone line, and a receive channel coupled between the telephone line and a speaker. Each of the channels has an attenuator or amplifier whose gain can be adjusted by a control circuit. In a typical "four-point" sensing scheme, the signal before and after the attenuator in the transmit and receive channels are monitored, providing four inputs to a control circuit. In conjunction with other signals, the control circuit uses the four-point sense inputs to switch the speakerphone to the channel with the greater speech signal.

Where voice signals are detected in both channels, one scheme adjusts the gain of the two amplifiers so they are equal, and then measures the two signals to determine which is larger, switching to the channel which has the larger signal. This allows one party to break in on the other, even though the amplifier for the interrupting party is attenuated compared to the other channel. Such a system is shown, for instance, in U. S. Pat. No. 4,724,540. This mode where both gains are equal is referred to as an "idle mode". Thus, a two-step process is followed to allow transition to another channel. First, the gains are equalized to enter into the "idle mode". Second, the amplitudes of the signals are compared while in the idle mode, and the channel with the highest amplitude signal is provided with the greater gain, to activate that channel.

Only one channel at a time can be provided with high gain in order to avoid "singing", caused by signal from the speaker feeding back into the microphone through acoustic coupling or by signal from the microphone feeding back through the hybrid side tone to the speaker through electrical coupling.

U. S. Pat. No. 4,879,745, assigned to IBM, shows a speakerphone in which the signals are converted into digital form. That digital speakerphone then uses a synchronous state machine to control the selection of either the transmit or receive audio path. Such a system provides the advantage of more flexibility in switching paths, but at the cost of the additional complexity of the digital circuitry.

SUMMARY OF THE INVENTION

The present invention provides a control circuit for a speakerphone circuit which utilizes an event driven system to determine the appropriate gain for the receive and transmit channels. Detectors monitor the relative magnitudes of the signal in the transmit and receive channels. Separate signal-to-noise detectors determine whether signals present in the two channels are speech or background noise. The control circuit uses these inputs, in conjunction with the present state of the system (i.e., transmit, receive, or idle) and transitions to a new state in accordance with predefined criteria incorporated into the control algorithm. In particular, the present invention allows a transition in a single step from a receive to a transmit state, without going through the idle mode. The ability to remember a current state provides the ability to implement a more sophisticated scheme for determining when to transition to a different state. The present invention is able to provide the event driven control circuit without requiring complex, digital programming, with the addition of "dummy" or "transition" states in the state diagram implemented by the control circuitry.

In the preferred embodiment, there are three active states; a receive state in which the gain of the receive attenuator is high compared to the transmit attenuator, a transmit state in which the transmit attenuator has a high gain compared to the receive attenuator, and an idle state in which the gains of the two attenuators are equalized. The control system transitions from the transmit to the receive state when voice is detected in the receive channel which has an amplitude greater by a preset margin than the amplitude of the transmit channel. Conversely, a transition is made from the receive state to the transmit state when there is voice detected in the transmit channel and the amplitude of the signal in the transmit channel is greater than the receive channel signal by a second preset margin. Transitions are made from the receive or transmit state to the idle state when no voice signal is detected in the receive or transmit channels, respectively. Transitions are made from the idle state to the receive or transmit state upon the detection of voice in that particular channel and the signal being above a predetermined minimum magnitude. Transition states are provided between the above states for two reasons: 1) to enable the implementation in simple logic by giving an even number of states, and 2) to provide hysteresis during the changing of states to prevent bouncing back and forth between states during a change.

For a fuller understanding of the nature and advantages of the invention, reference should be made to the ensuing detailed description taken in conjunction with the accompanying drawings.

DETAILED DESCRIPTION OF THE PREFERRED EMBODIMENT

Figure 1:
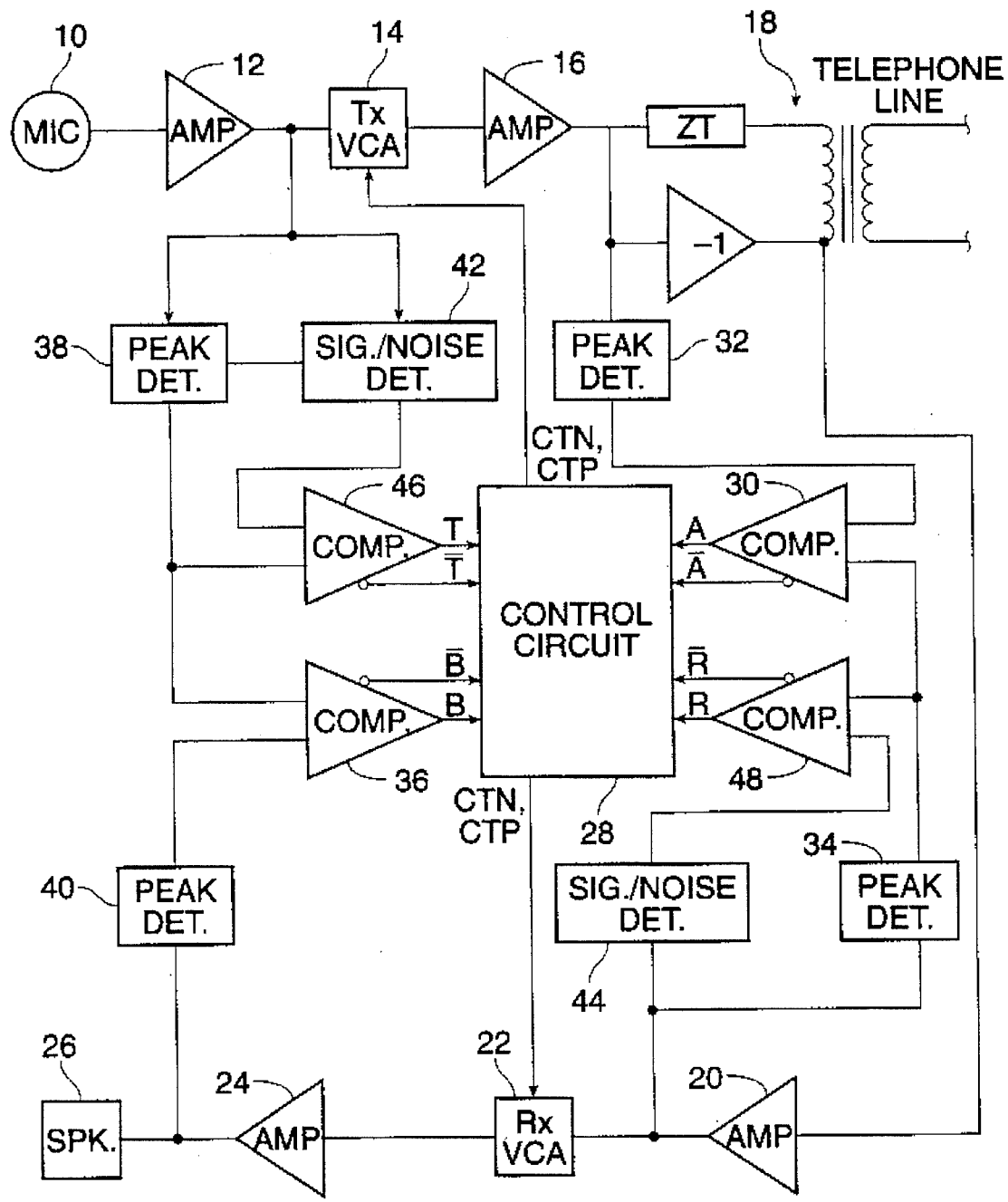
FIG. 1 is a block diagram of a four-point sensing circuit utilizing the present invention.

FIG. 1 is a block diagram of a speakerphone circuit according to the present invention. A microphone 10 provides a signal through a microphone amplifier 12, a voltage controlled amplifier 14, a second amplifier 16, and a transmission circuit 18 coupled to the phone line. A receive channel provides a signal from transmission circuit 18 through a filtering amplifier 20, a voltage controlled amplifier 22, and a speaker amplifier 24 to a speaker 26. A control circuit 28 controls the gain of the transmit amplifier 14 and a receive amplifier 22.

The gain of the transmit and receive channel amplifiers are set to opposite levels, so that only one channel has its gain set to a high value at any one time. The exception is the idle mode, in which both gains are equalized when neither party is talking, or when the predominant signal in both channels is noise.

The control circuit operates on four inputs. A first input is indicated as A. This signal comes from a comparator 30 which receives its inputs through peak detectors 32 and 34, respectively, from the output of amplifier 16 on the transmit channel and the output of amplifier 20 on the receive channel. Similarly, a comparator 36 provides signal B from a comparison of the signals provided through peak detectors 38 and 40 coupled to the output of microphone amplifier 12 and speaker amplifier 24, respectively.

The other inputs, which indicate whether voice is present, are from noise discriminator circuits 42 and 44. These circuits, which indicate the noise level, are compared to the signals from peak detectors 38 and 34, respectively, in comparators 46 and 48, respectively, to provide signals T and R to the control circuit. The signal T indicates the presence of voice in the transmit channel, while the signal R indicates the presence of voice in the receive channel.

Figures 2, 3:
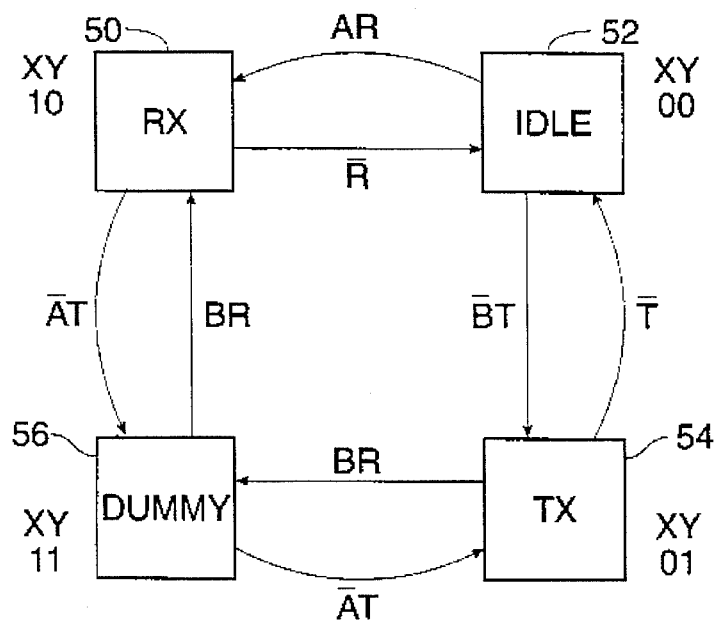
FIG. 2 is a table setting forth the comparator conditions for the comparators of FIG. 1.
FIG. 3 is a state diagram setting forth the event driven operation of the control circuit of FIG. 1.

FIG. 2 sets forth the comparator conditions for one embodiment of the present invention. These conditions require that one signal not merely exceed the other in the comparator, but the other is exceeded by a designated margin. Basically, the $\overline{A}$ and $\overline{B}$ signals, which have 2:1 and 1.1:1 ratios, are used for transitioning from the idle state, where no signal is detected in either channel, to one of the channels. The larger comparison of 10:1 and 18.8:1 required for signals $\overline{A}$ and $\overline{B}$ is used to transition from the transmit to the receive channel, or vice versa, when one party is trying to break in on the other. A larger ratio is required here so that one party is not constantly interrupted by small sounds.

The comparison ratios set forth above are determined in practice by the gain and attenuation aspects of the signal paths to the comparators in FIG. 1. The gain of the microphone 10, the transmit attenuator 14 and the amplifiers 12, 16 along with the peak detector circuit 32 determine the gain of that path, for instance. Different gain ratios may be used for different applications. For instance, in a car telephone, where there is large background noise, a large threshold may be required to transmit a signal from the car to break in on the signal being received. Conversely, in the normal office environment, it may be desirable to have the gains approximately equal.

FIG. 3 is a state diagram illustrating the operation of a simplified control circuit utilizing the inputs designated in FIG. 1 with the conditions set forth in FIG. 2. The state diagram shows four states, a receive state 50, an idle state 52, a transmit state 54, and a dummy state 56. The transitions to the dummy state actually pass through it to the next state, as indicated by the arrows. The dummy state is included for the particular embodiment, using latches to implement the event driven circuit. Two latches are used, designated X and Y, providing four possible states. To ensure correct operation, it is not permissible for both latches to change simultaneously. In a system containing only three states this condition cannot be realized. Therefore a dummy state is included in the transition from transmit to receive or vice versa, allowing first one latch to change and then the other. Other system implementations could be used which would not require such a dummy state.

The signals used in the event driven circuit are the inputs to control circuit 28 of FIG. 1, and indicate the following:

T=Voice present on transmit channel $\overline{T}$=Noise or no voice present on transmit channel R=Voice present on receive channel $\overline{R}$=Noise or no voice present on receive channel A=Rx signal>Tx signal $\overline{A}$=Rx signal<Tx signal B=Tx signal<Rx signal $\overline{B}$=Tx signal>Rx signal The idle state 52 is the state in which the circuit will remain when the noise is greater than speech in the two channels or when there is no signal at all present. In this state, the gain of the two voltage controlled amplifiers will be equal. A transition from the idle state to receive state 50 is indicated by AR, indicating that the receive signal is greater than the transmit signal, and that a voice signal is present on the receive channel. Because of the various gain levels in the signal path, the conditions set forth in FIG. 2, are that the receive channel magnitude be greater than twice the transmit channel magnitude. Once in the receive state 50, the gain of the receive attenuator is adjusted upward, such that the transition to the transmit state 54, indicated by the condition $\overline{A}T$, requires that the transmit channel be more than ten times the magnitude of the receive channel. The rest of the state diagram should be self-explanatory.

Upon transition from one state to another, the gains of the attenuators 14 and 22 are adjusted to reflect the new state of the system, creating different comparison ratios for determining the transition to the next state. Hysteresis is thereby introduced into the system to prevent unwanted rapid switching between the transmit and receive states.

Figure 4:
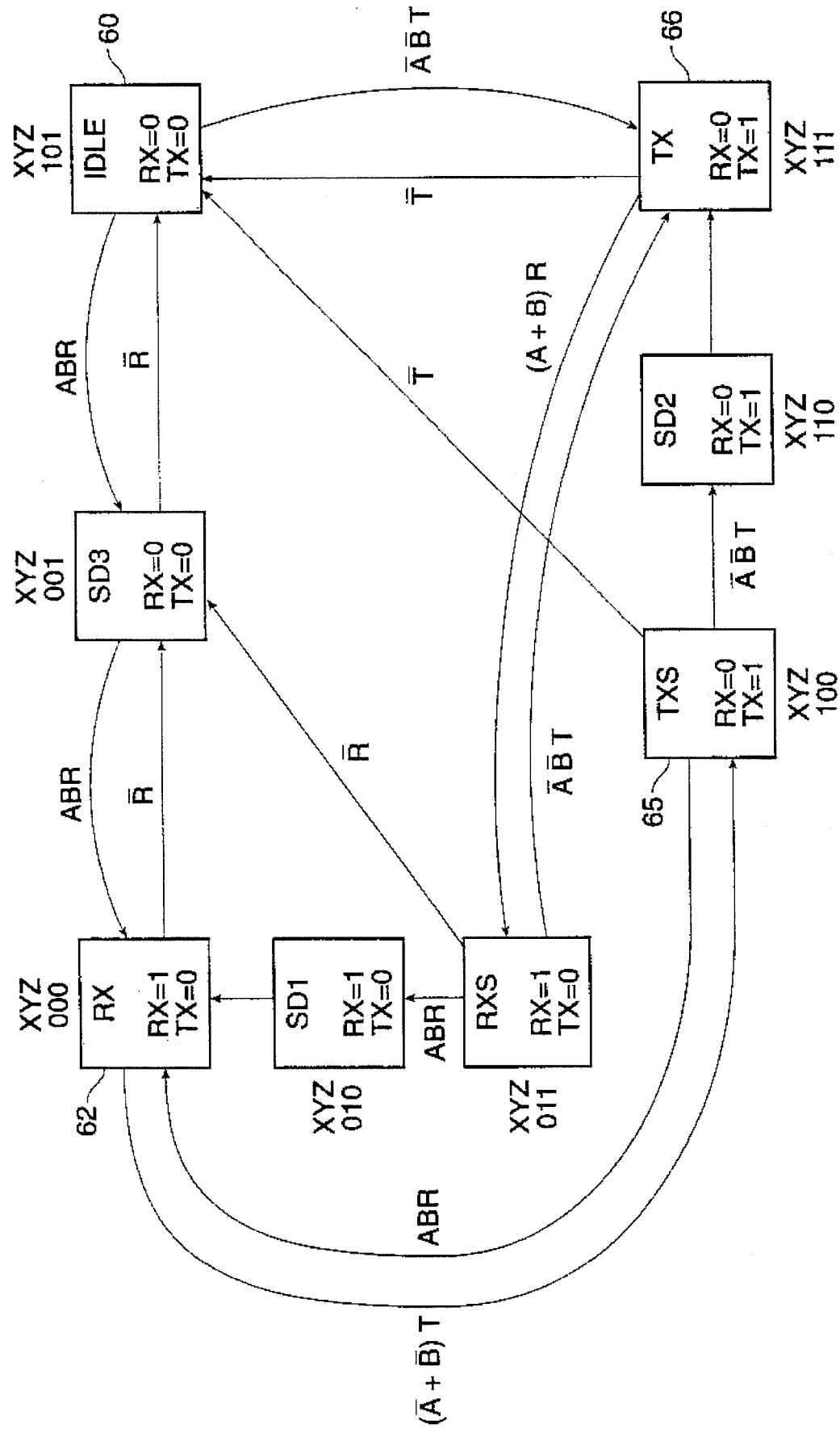
FIG. 4 is a state diagram of an alternate event driven circuit.

FIG. 4 shows the preferred embodiment of the state diagram. Two extra switching states are included in the system, increasing the required number of states to five. The extra states ensure that the gain change of the attenuators, which occurs at a rate much slower than the operation of the control system, is completed before the system enters a new stable state (transmit or receive). Three latches are used, designated X, Y and Z providing eight possible states. To ensure correct operation, three dummy states, SD1, SD2 and SD3 are included in the state diagram. In addition to the extra switching states a more complete set of comparisons is made. For example the transition from idle state 60 to receive state 62 requires a condition ABR, indicating that not only must Rx be greater than Tx by the value corresponding to the gain presented by the signal paths to comparator 30, but also by the gain corresponding to the signal paths to comparator 36. Thus, this condition effectively requires that the larger of the two be present to effect the transition. The transition from receive state 62 to transmit switching state 65 requires the condition $\overline{B}T+\overline{A}T$ (the symbol +indicating an OR condition). This condition effectively allows a transition from the receive channel to the transmit channel upon the lesser threshold of two comparators being met.

Figure 5:
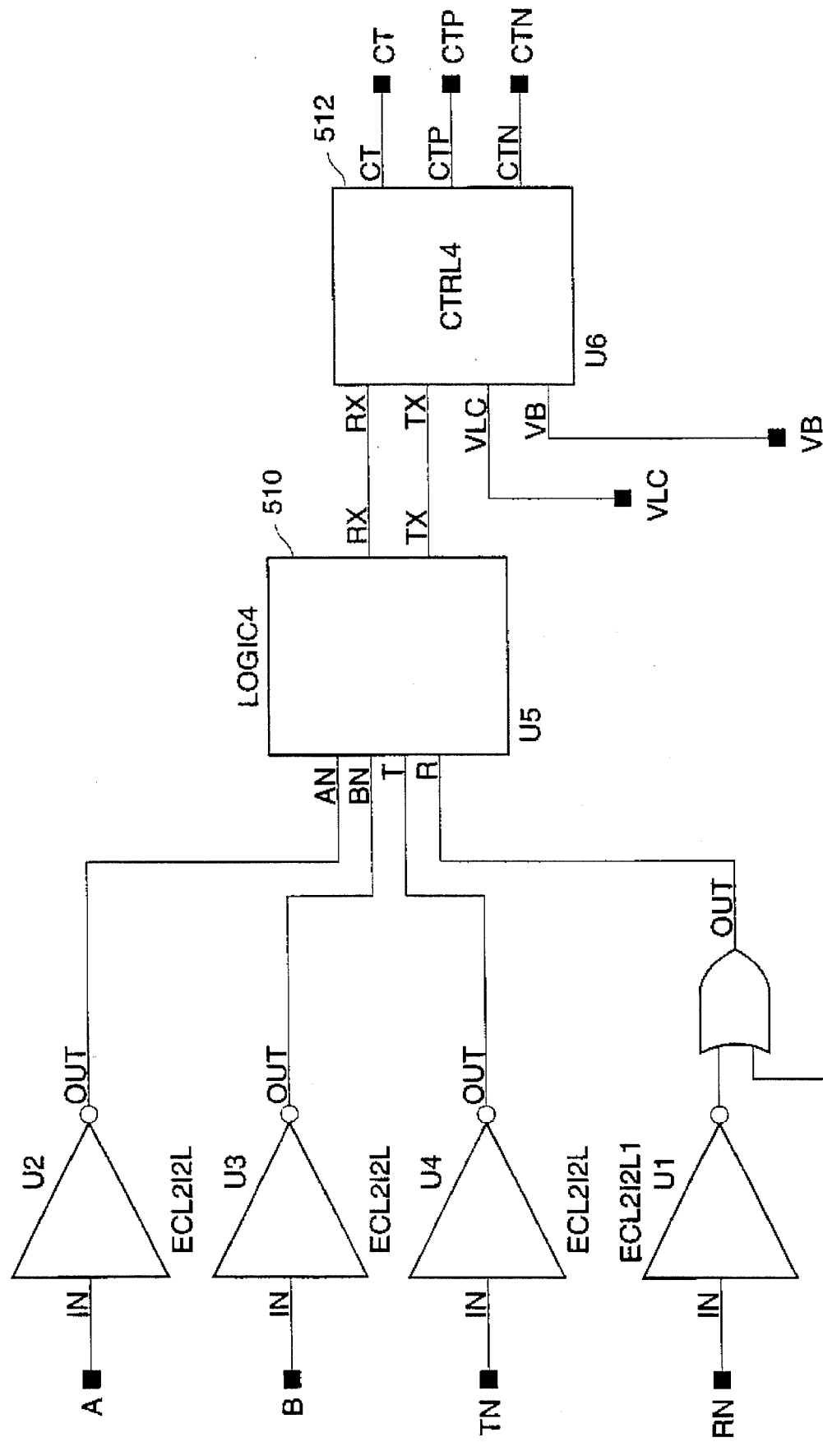
FIG. 5 is a block diagram of the control circuit of FIG. 1.

FIG. 5 is a block diagram of control circuit 28 of FIG. 1. Although T and $\overline{T}$ and A and $\overline{A}$, etc., signals are shown in FIG. 1, in the implementation of FIG. 5, only the A, B, $\overline{T}$ and $\overline{R}$ signals are provided from the comparators. These are inverted through inverters U1–U4 and provided to a logic block 510, which implements the event driven circuit. The logic block provides Rx and Tx output signals to control circuit 512. The output signal Rx is active when the event driven circuit enters the states RX, RXS or SD1. The output signal Tx is activated when the system enters the states TX, TXS or SD2.

Figure 6:
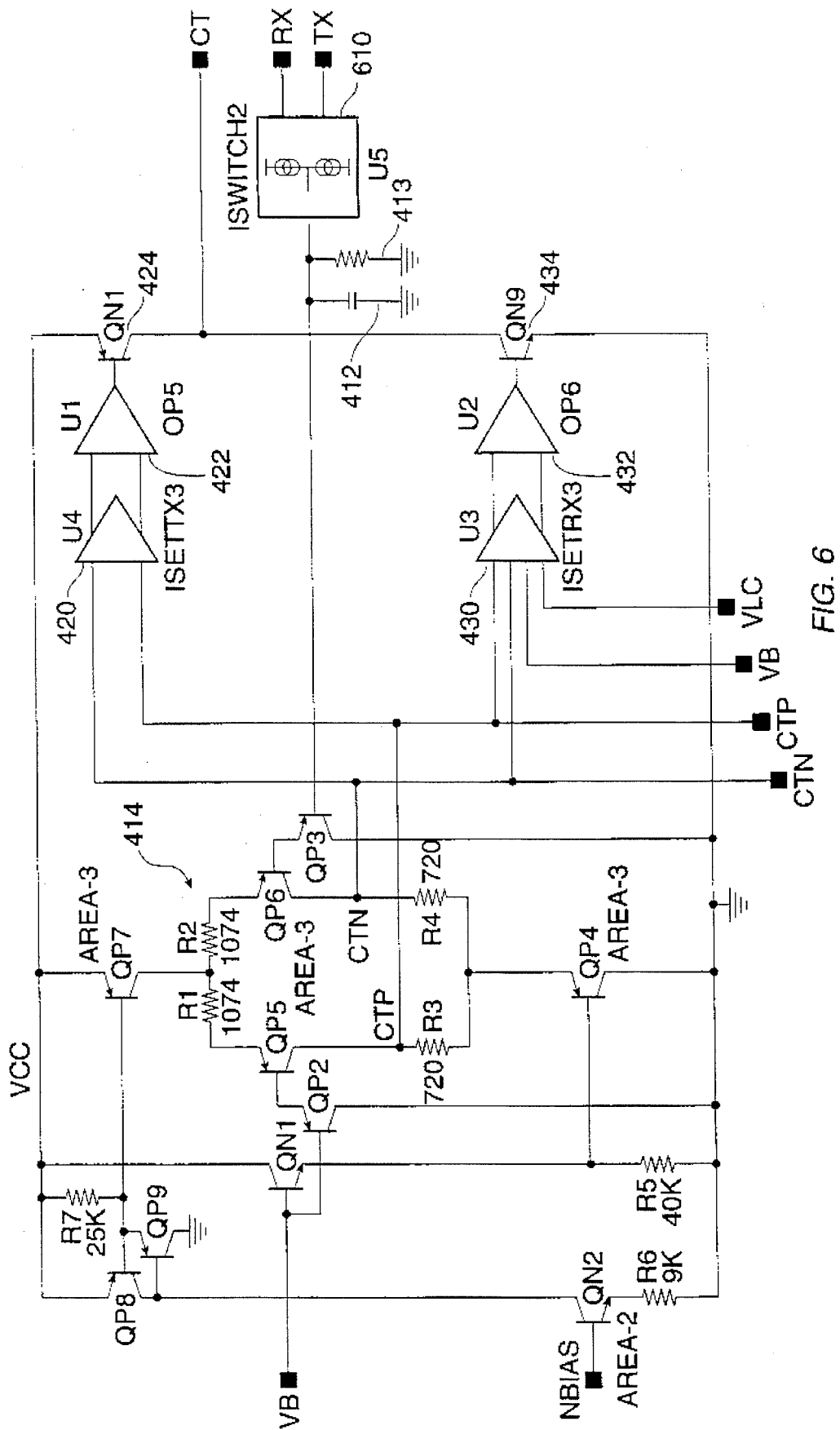
FIG. 6 is a circuit diagram of the control circuit of FIG. 5.

The details of control circuit 512 are shown in FIG. 6. FIG. 6 shows differential amplifier 414, with output CTN and CTP providing the gain control signals to attenuators 14 and 22 of FIG. 1. These are connected to feedback through current setting amplifiers 420 and 430 for the transmit and receive channels, respectively, and through operational amplifiers 422 and 432, respectively. These are in turn coupled to transistors 424 and 434 to a capacitor 412 and resistor 413, which is connected to two current sources in a current switching circuit 610 coupled to the Rx and Tx signals of FIG. 5.

Figure 7:
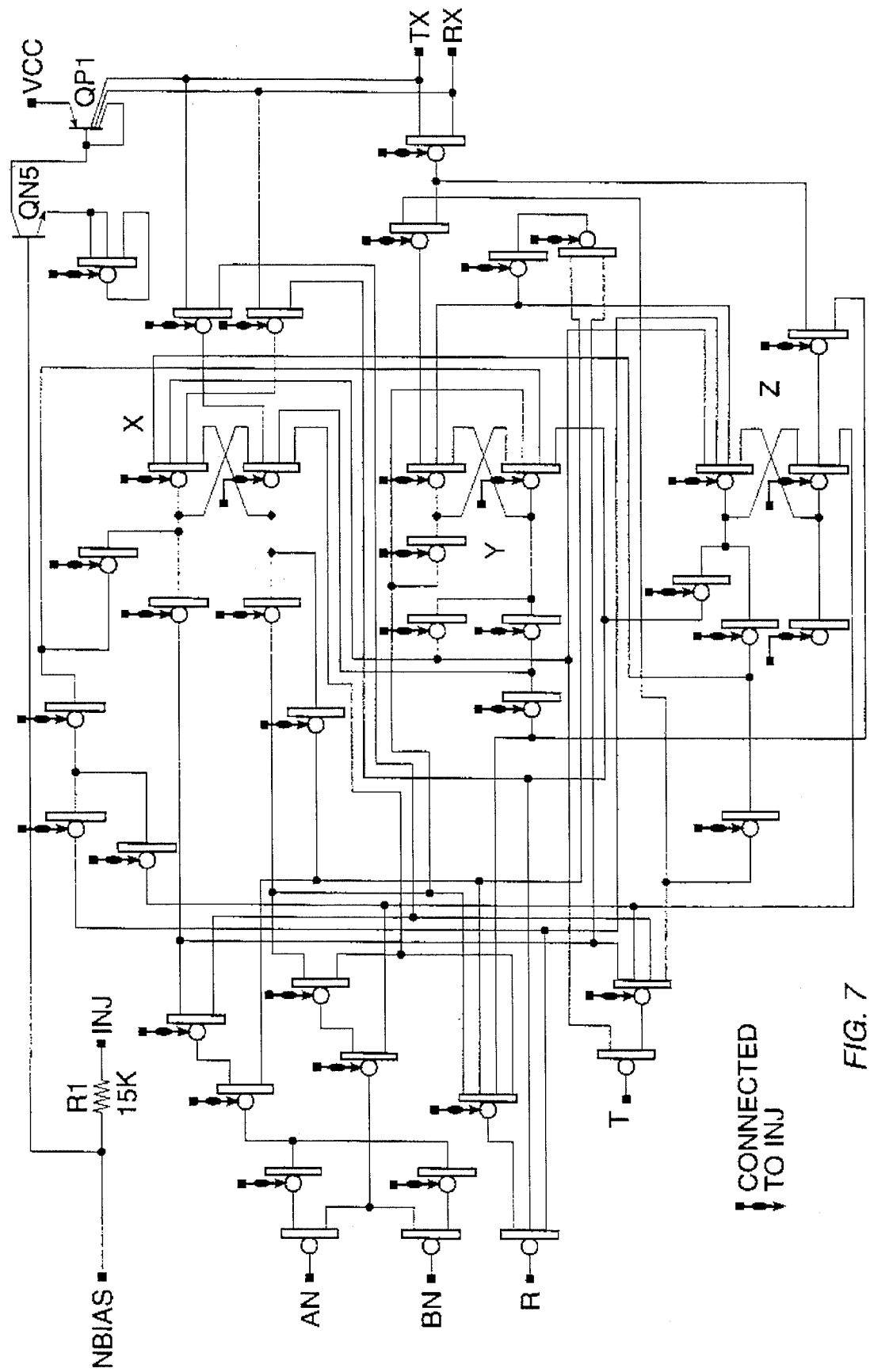
FIG. 7 is a block diagram of the logic circuit of FIG. 5.

FIG. 7 shows the detail of logic block 510 of FIG. 5. The inputs are shown on the left to a series of switches, with latches X, Y and Z being shown on the right side of the figure.

As will be understood by those familiar with the art, the present invention may be embodied in other specific forms without departing from the spirit or essential characteristics thereof. For example, different state transition rules could be used or different logic implementation of the event driven circuit could be implemented, such as one using a ROM for storing the states. Accordingly, the disclosure of the preferred embodiment of the invention is intended to be illustrative, but not limiting, of the scope of the invention which is set forth in the following claims.

What is claimed is:

1. In a speakerphone circuit having analog transmit and receive channels with transmit and receive analog amplifiers, a control circuit for varying the gain of the amplifiers, comprising:

means, coupled to at least the inputs of said transmit and receive amplifiers, for measuring the relative magnitude of signals in said transmit and receive channels;

means, coupled to said transmit and receive channels, for detecting the presence of a voice signal on said transmit and receive channels; and an event driven circuit, having inputs coupled to said means for measuring and said means for detecting and outputs coupled to said transmit and receive amplifiers, for varying the gain of said amplifiers in accordance with said inputs and a present state of said event driven circuit;

said event driven circuit having a transmit state, a receive state, an idle state and at least one transition state between said transmit and receive states.

2. The speakerphone circuit of claim 1 wherein in said transmit state the gain of said transmit amplifier is greater than the gain of said receive amplifier;

in said receive state the gain of said receive amplifier is greater than the gain of said transmit amplifier; and in said idle state the gain of said transmit and receive amplifiers is equalized.

3. The speakerphone circuit of claim 2 wherein said event driven circuit further comprises:

means for transitioning from said transmit state to said receive state when said means for detecting detects a voice signal in said receive channel and said means for measuring determines that the amplitude of signals in said receive channel is greater than the amplitude of signals in said transmit channel by a pre-determined amount; and means for transitioning from said receive state to said transmit state when said means for detecting detects a voice signal in said transmit channel and said means for measuring determines that the amplitude of signals in said transmit channel is greater than the amplitude of signals in said receive channel by a predetermined amount.

4. The speakerphone circuit of claim 2 wherein said means for measuring relative magnitude comprises:

a first comparator having a first input coupled to an output of said transmit amplifier, and a second input coupled to an input of said receive amplifier; and a second comparator having a first input coupled to an input of said transmit amplifier and a second input coupled to an output of said receive amplifier.

5. The speakerphone circuit of claim 4 wherein said event driven circuit includes means for directly adjusting the gains of said amplifiers from said transmit state to said receive state when either of said comparators provides a signal indicating an amplitude of a receive signal is greater than an amplitude of a transmit signal by a predetermined amount.

6. The speakerphone circuit of claim 4 wherein said event driven circuit includes means for transitioning from said idle state to said receive state when both of said comparators indicate the receive signal is greater than the transmit signal, and said means for detecting the presence of a voice signal indicates the presence of a voice signal on said receive channel.

7. The speakerphone circuit of claim 4 wherein the relative magnitudes of the transmit and receive signals required to produce an output of said comparators vary between said idle state and said receive state.

8. The speakerphone circuit of claim 2 wherein said transition state comprises a first switching state for transitions from said transmit state to said receive state, and a second switching state for transitions from said receive state to said transmit state, the gains of said transmit and receive amplifiers in said second switching state and said first switching state transitioning to the gains in said transmit and receive states, respectively.

9. The speakerphone circuit of claim 8 wherein said event driven circuit transitions from said transmit state to said first switching state when the magnitude of the signal in said receive channel is larger than the magnitude of the signal in said transmit channel by a first predetermined amount, and transitions from said second switching state to said receive state when the magnitude of the signal in said receive channel is larger than the magnitude of the signal in said transmit channel by a second predetermined amount, larger than said first predetermined amount.

10. The speakerphone circuit of claim 9 wherein said event driven circuit transitions from said receive state to said second switching state when the magnitude of the signal in said transmit channel is larger than the magnitude of the signal in said receive channel by a third predetermined amount, and transitions from said second switching state to said transmit state when the magnitude of the signal in said transmit channel is larger than the magnitude of the signal in said receive channel by a fourth predetermined amount, larger than said third predetermined amount.

11. The speakerphone circuit of claim 8 wherein said event driven circuit includes a first dummy state located between said idle state and said receive state, a second dummy state located between said first switching state and said receive state, and a third dummy state located between said second switching state and said transmit state.

12. The speakerphone circuit of claim 1 wherein said event driven circuit includes a plurality of latches.

13. In a speakerphone circuit having analog transmit and receive channels with transmit and receive analog amplifiers, a control circuit for varying the gain of the amplifiers, comprising:

a first comparator having a first input coupled to an output side of said transmit attenuator, and a second input coupled to an input side of said receive attenuator;

a second comparator having a first input coupled to an input side of said transmit attenuator and a second input coupled to an output side of said receive attenuator;

means, coupled to said transmit and receive channels, for detecting the presence of a voice signal on said transmit and receive channels; and an event driven circuit, having inputs coupled to outputs of said comparators and said means for detecting, and outputs coupled to said transmit and receive amplifiers, for varying the gain of said amplifiers in accordance with said inputs and a present state of said event driven circuit;

said event driven circuit having a transmit state, a receive state, an idle state and at least one transition state between said transmit and receive states.

14. The speakerphone circuit of claim 13 wherein said event driven circuit includes a plurality of latches.

15. The speakerphone circuit of claim 13 further comprising:

said transition state comprising a first switching state for transitions from said transmit state to said receive state;

a second switching state for transitions from said receive state to said transmit state, the gains of said transmit and receive amplifiers in said second switching state and said first switching state transitioning to the gains in said transmit and receive states, respectively;

a first dummy state located between said idle state and said receive state;

a second dummy state located between said first switching state and said receive state; and a third dummy state located between said second switching state and said transmit state.

16. The speakerphone circuit of claim 13 wherein said event driven circuit includes:

means for directly setting the gains of said amplifiers to values for said transmit state when in said receive state and an output of either of said comparators indicates a stronger signal in said transmit channel; and means for directly setting the gains of said amplifiers to values for said receive state when in said transmit state and an output of either of said comparators indicates a stronger signal in said receive channel.

17. In a speakerphone circuit having analog transmit and receive channels with transmit and receive analog amplifiers, a control circuit for varying the gain of the amplifiers, comprising:

a first comparator having a first input coupled to an output side of said transmit attenuator, and a second input coupled to an input side of said receive attenuator;

a second comparator having a first input coupled to an input side of said transmit attenuator and a second input coupled to an output side of said receive attenuator;

means, coupled to said transmit and receive channels, for detecting the presence of a voice signal on said transmit and receive channels; and an event driven circuit having inputs coupled to outputs of said comparators and said means for detecting, and outputs coupled to said transmit and receive amplifiers, for varying the gain of said amplifiers in accordance with said inputs and a present state of said event driven circuit;

said event driven circuit having a transmit state, a receive state, an idle state and at least one transition state between said transmit and receive states; and said event driven circuit including means for directly setting the gains of said amplifiers to values for said transmit state when in said receive state and an output of either of said comparators indicates a stronger signal in said transmit channel; and means for directly setting the gains of said amplifiers to values for said receive state when in said transmit state and an output of either of said comparators indicates a stronger signal in said receive channel.

18. In a speakerphone circuit having analog transmit and receive channels with transmit and receive analog amplifiers, a control circuit for varying the gain of the amplifiers, comprising:

a first signal detector coupled to an input side of said transmit amplifier;

a second signal detector coupled to an output side of said transmit amplifier;

a third signal detector coupled to an input side of said receive amplifier;

a fourth signal detector coupled to an output side of said receive amplifier;

a first comparator having a first input coupled to an output of said second signal detector, and a second input coupled to an output of said third signal detector;

a second comparator having a first input coupled to an output of said first signal detector and a second input coupled to an output of said fourth signal detector;

a first noise discriminator circuit coupled to an input side of said transmit amplifier;

a second noise discriminator circuit coupled to an input side of said receive amplifier;

a third comparator having a first input coupled to an output of said first noise discriminator and a second input coupled to an output of said first signal detector;

a fourth comparator having a first input coupled to an output of said second noise discriminator and a second input coupled to an output of said third signal detector;

an event driven circuit comprising a plurality of latches, said event driven circuit having inputs coupled to outputs of said comparators, and outputs coupled to said transmit and receive amplifiers, for varying the gain of said amplifiers in accordance with said inputs and a present state of said event driven circuit;

said event driven circuit having a transmit state, a receive state, an idle state and at least one transition state between said transmit and receive states;

said event driven circuit including means for directly setting the gains of said amplifiers to values for said transmit state when in said receive state and an output of either of said comparators indicates a stronger signal in said transmit channel;

means for directly setting the gains of said amplifiers to values for said receive state when in said transmit state and an output of either of said comparators indicates a stronger signal in said receive channel;

a first switching state for transitions from said transmit state to said receive state;

a second switching state for transitions from said receive state to said transmit state, the gains of said transmit and receive amplifiers in said second switching state and said first switching state transitioning to the gains in said transmit and receive states, respectively;

a first dummy state located between said idle state and said receive state;

a second dummy state located between said first switching state and said receive state; and a third dummy state located between said second switching state and said transmit state.

19. The speakerphone circuit of claim 3 wherein said predetermined amount corresponds to one signal being at least 10 times larger.

20. The speakerphone circuit of claim 5 wherein said predetermined amount corresponds to one signal being at least 10 times larger.

* * * * *